United States Patent [19]

Nilssen

[11] Patent Number: 4,885,506
[45] Date of Patent: Dec. 5, 1989

[54] ELECTRONIC MAGNETRON POWER SUPPLY

[76] Inventor: Ole K. Nilssen, Caesar Dr., Rte. 5, Barrington, Ill. 60010

[21] Appl. No.: 679,139

[22] Filed: Dec. 6, 1984

[51] Int. Cl.$^4$ ............................................. H05B 41/14
[52] U.S. Cl. .................................. 315/102; 315/39.51; 219/10.55 B; 331/87
[58] Field of Search ............................. 315/39.51, 102; 219/10.55 B; 363/71, 75; 331/87

[56] References Cited

U.S. PATENT DOCUMENTS

| | | | |
|---|---|---|---|
| Re. 20,317 | 3/1937 | Suits | 363/75 |
| Re. 31,758 | 12/1984 | Nilssen | 315/97 |
| 3,717,793 | 2/1973 | Peterson | 219/10.55 B |
| 3,973,165 | 8/1976 | Hester | 331/87 |
| 4,002,875 | 1/1977 | Kiuchi et al. | 219/10.49 R |
| 4,076,996 | 2/1978 | Maehara et al. | 315/106 |
| 4,194,160 | 3/1980 | Loucks | 219/10.55 B |
| 4,222,098 | 9/1980 | Nagano | 363/71 |
| 4,593,167 | 6/1986 | Nilssen | 219/10.55 B |

Primary Examiner—Robert L. Griffin
Assistant Examiner—T. Salindong

[57] ABSTRACT

In a power-line-operated inverter-type magnetron power supply having a high-Q resonant L-C circuit series-excited by the inverter and parallel-loaded by the magnetron, subject invention provides for cost-effective means to prevent the destructive overload of the inverter and/or the L-C circuit that may occur during the brief period before the magnetron cathode becomes incandescent. In this power supply, the unfiltered pulsed DC output of a full-wave power-line-supplied rectifier means is applied to a pair of inverters: an auxiliary inverter for heating the magnetron cathode, and a main inverter for providing the main magnetron power. The auxiliary inverter starts operating immediately upon application of power from the power line, and therefore immediately starts the process of cathode heating. The main inverter, however, is not started until after the cathode has reached incandescence, at which time the magnetron will adequately load the series-resonant L-C circuit and thereby prevent such destructive overload.

15 Claims, 2 Drawing Sheets

ELECTRONIC MAGNETRON POWER SUPPLY

BACKGROUND OF THE INVENTION

FIELD OF THE INVENTION

The present invention relates to power-line-operated electronic inverter-type magnetron power supplies for microwave ovens.

PRIOR ART

Power-line-operated electronic inverter-type magnetron power supplies have been previously described, such as in U.S. Pat. Nos. 3,973,165 to Hester, or in 4,002,875 to Kiuchi et al. However, these previously described power supplies have not integrally addressed, let alone resolved, several basic issues associated with the practical application of such power supplies. These issues relate to: (i) the power factor by which the power supply draws power from the power line; (ii) the power factor at which the inverter supplies its output power; and (iii) the crest-factor of the current supplied to the magnetron, the crest-factor being the ratio of peak to average current.

BACKGROUND CONSIDERATIONS

In powering a magnetron by way of a power-line-operated electronic inverter-type power supply, in order to achieve an acceptably good power factor in respect to the loading represented by the inverter, as well as in respect to the loading presented to the inventor, it is desirable to extract the power from the inverter by way of a tuned circuit. Otherwise, the Volt-Ampere product that must be supplied by the power line to the inverter, as well as the Volt-Ampere product that must be supplied by the inverter to the magnetron, get to be unacceptably large.

It is particularly desirable to power the magnetron by way of a high-Q resonant L-C circuit wherein the magnetron load is effectively parallel-connected across the tank capacitor of the L-C circuit, and wherein this L-C circuit is effectively series-connected across the inverter's output.

However, when such a high-Q series-excited resonant L-C circuit is not loaded, it acts in effect as a short circuit; which, if allowed to exist for even a very brief period, is apt to cause destructive overload of the inverter and/or the L-C circuit.

In an ordinary magnetron, a cathode must be heated to incandescence before electron emission starts and therefore before the magnetron becomes conductive; and this heating process or pre-conditioning is apt to require from one to two seconds.

Thus, aside from the relatively modest amount of power needed to accomplish the pre-conditioning, a magnetron is substantially a non-conducting load until its cathode has reached incandescence; which implies that, during this brief period of one to two seconds, the short circuit represented by the L-C circuit is apt to cause desructive overload.

One way of preventing such destructive overload is that of connecting in parallel with the magnetron a voltage-limiting means (like a Varistor) characterized by (i) not conducting at the highest magnitude of voltage normally present across the magnetron when it is conducting; and (ii) conducting heavily at a voltage of somewhat higher magnitude than that.

However, due to the significant amount of energy that must be absorbed by this voltage limiting means, being on the order of 1000 to 2000 Joule for a conditioning period of one to two seconds, the effective cost associated with such a method of preventing destructive overload of inverter and/or L-C circuit is very high.

In respect to the current crest-factor, it is noted that prior-art inverter-type magnetron power supplies provide to the magnetron unidirectional current pulses at the relatively high frequency of the inverter, but with the magnitude of these pulses varying in direct proportion with the instantaneous magnitude of the power line voltage. The crest-factor resulting from this double-modulation of the magnetron current is particularly disadvantageous.

SUMMARY OF THE INVENTION

OBJECTS OF THE INVENTION

An object of the present invention is that of providing a basis for designing power-line-operated, high-power-factor, high-efficiency, cost-effective, inverter-type magnetron power supplies.

Another object is that of providing an inverter-type power supply that is operative to safely power a magnetron load that is parallel-connected with a series-excited high-Q resonant L-C circuit.

These as well as other important objects and advantages of the present invention will become apparent from the following description.

BRIEF DESCRIPTION

In its preferred embodiment, subject invention constitutes a power-line-operated electronic inverter-type magnetron power supply that comprises an inverter operable to series-excite a high-Q parallel-loaded resonant L-C circuit, where the parallel-connected load is a magnetron of such a nature as to have to be conditioned for a period of about two seconds before becoming fully operative as a load. This pre-conditioning involves heating the magnetron's cathode to the point of incandescence.

In this power supply, the unfiltered pulsed DC output of a full-wave rectifier is applied to a pair of inverters'an auxiliary inverter for pre-conditioning the magnetron, and a main inverter for powering the magnetron. The auxiliary inverter starts operating immediately upon application of power from the power line; and its output is used for pre-conditioning the magnetron. The main inverter is only started after the preconditioning is completed.

Both inverters are of the type that must be triggered into oscillation; and, since the pulsed DC supply voltage falls to zero magnitude once every half-cycle of the 60 Hz power line voltage, and since the inverters then cease oscillating, it is necessary for each inverter to be re-triggered for each halfcycle of 60 Hz voltage for as long as power output is desired from it.

To ascertain a good crest-factor in respect to the current provided to the magnetron, filtering means have been provided by which high frequency modulations of the magnetron current are substantially eliminated.

DESCRIPTION OF THE PREFERRED EMBODIMENT

DETAILS OF CONSTRUCTION

Figure 1:
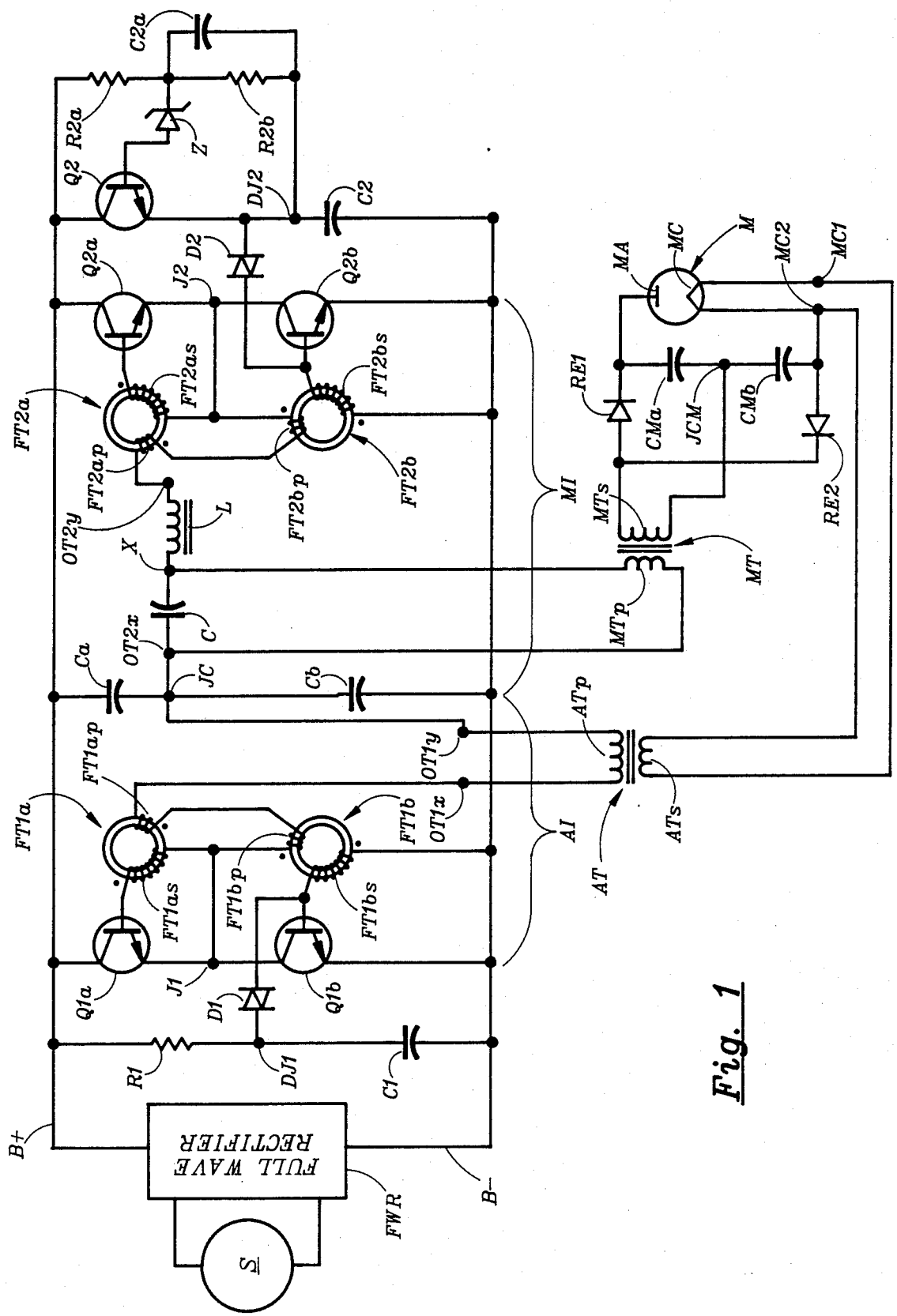
FIG. 1 provides a schematic circuit diagram of the preferred embodiment of the invention.

FIG. 1 shows an AC voltage source S, which in reality is an ordinary 120 Volt/60 Hz electric utility power line.

Connected to S is a full-wave rectifier FWR that rectifies the AC voltage from S to provide an unfiltered DC voltage between a positive power bus B+ and a negative power bus B−.

A first pair of transistors Q1a and Q1b are connected in series between the B+ bus and the B− bus in such a way that the collector of Q1a is connected to the B+ bus, the emitter of Q1a is connected with the collector of Q1b at a junction J1, and the emitter of Q1b is connected with the B− bus.

A second pair of transistors Q2a and Q2b are connected in series between the B+ bus and the B− bus in such a way that the collector of Q2a is connected to the B+ bus, the emitter of Q2a is connected with the collector of Q2b at a junction J2, and the emitter of Q2b is connected with the B− bus.

Primary winding FT1ap of saturable feedback transformer FT1a and primary winding FT1bp of saturable feedback transformer FT1b are connected in series between junction J1 and output terminal OT1x. Another output terminal OT1y is connected with junction JC between capacitors Ca and Cb; which capacitors are connected in series between the B+ bus and the B− bus.

Primary winding FT2ap of saturable feedback transformer FT2a and primary winding FT2bp of saturable feedback transformer FT2b are connected in series between junction J2 and output terminal OT2y. Another output terminal OT2x is connected with junction JC.

Secondary winding FT1as of feedback transformer FT1a is connected between the base and the emitter of transistor Q1a; and secondary winding FT1bs of feedback transformer FT1b is connected between the base and the emitter of transistor Q1b.

Secondary winding FT2as of feedback transformer FT2a is connected between the base and the emitter of transistor Q2a; and secondary winding FT2bs of feedback transformer FT2b is connected between the base and the emitter of transistor Q2b.

A capacitor C is connected between output terminal OT2x and a point X; and an inductor L is connected between point X and output terminal OT2y.

Primary winding ATp of auxiliary transformer AT is connected with inverter output terminals OT1x and OT1y. Secondary winding ATs of transformer AT is connected with magnetron cathode terminals MC1 and MC2.

Primary winding MTp of main transformer MT is connected between point X and output terminal OT2x. Secondary winding MTs of transformer MT is connected between the anode of high-voltage rectifier RE1 and a junction JCM between two capacitors CMa and CMb.

Capacitor CMa is connected between junction JCM and the cathode of rectifier RE1; capacitor CMb is connected between junction JCM and the anode of a rectifier RE2. The cathode of rectifier RE2 is connected with the anode of rectifier RE1.

The cathode of rectifier RE1 is connected with the anode MA of magnetron M. The anode of rectifier RE2 is connected with cathode terminal MC2 of magnetron M.

A resistor R1 is connected between the B+ bus and a junction DJ1; a capacitor C1 is connected between junction DJ1 and the B− bus; and a Diac D1 is connected between junction DJ1 and the base of transistor Q1b.

An auxiliary transistor Q2 is connected with its collector to the B+ bus and with its emitter to junction DJ2. A capacitor C2 is connected between junction DJ2 and the B− bus; and a Diac D2 is connected between junction DJ2 and the base of transistor Q2b. A resistor R2b and a capacitor C2a are connected in parallel between junction DJ2 and the cathode of a Zener diode Z, whose anode is connected with the base of auxiliary transistor Q2. A resistor R2a is connected between the B+ bus and the cathode of Zener diode Z.

The assembly consisting of transistors Q1a and Q1b, feedback transformers FT1a and FT1b, and output terminals OT1x and OT1y, is referred to as auxiliary inverter AI.

The assembly consisting of transistors Q2a and Q2b, feedback transformers FT2a and FT2b, and output terminals OT2x and OT2y, is referred to as main inverter MI.

Explanation of Waveforms

Figure 2:
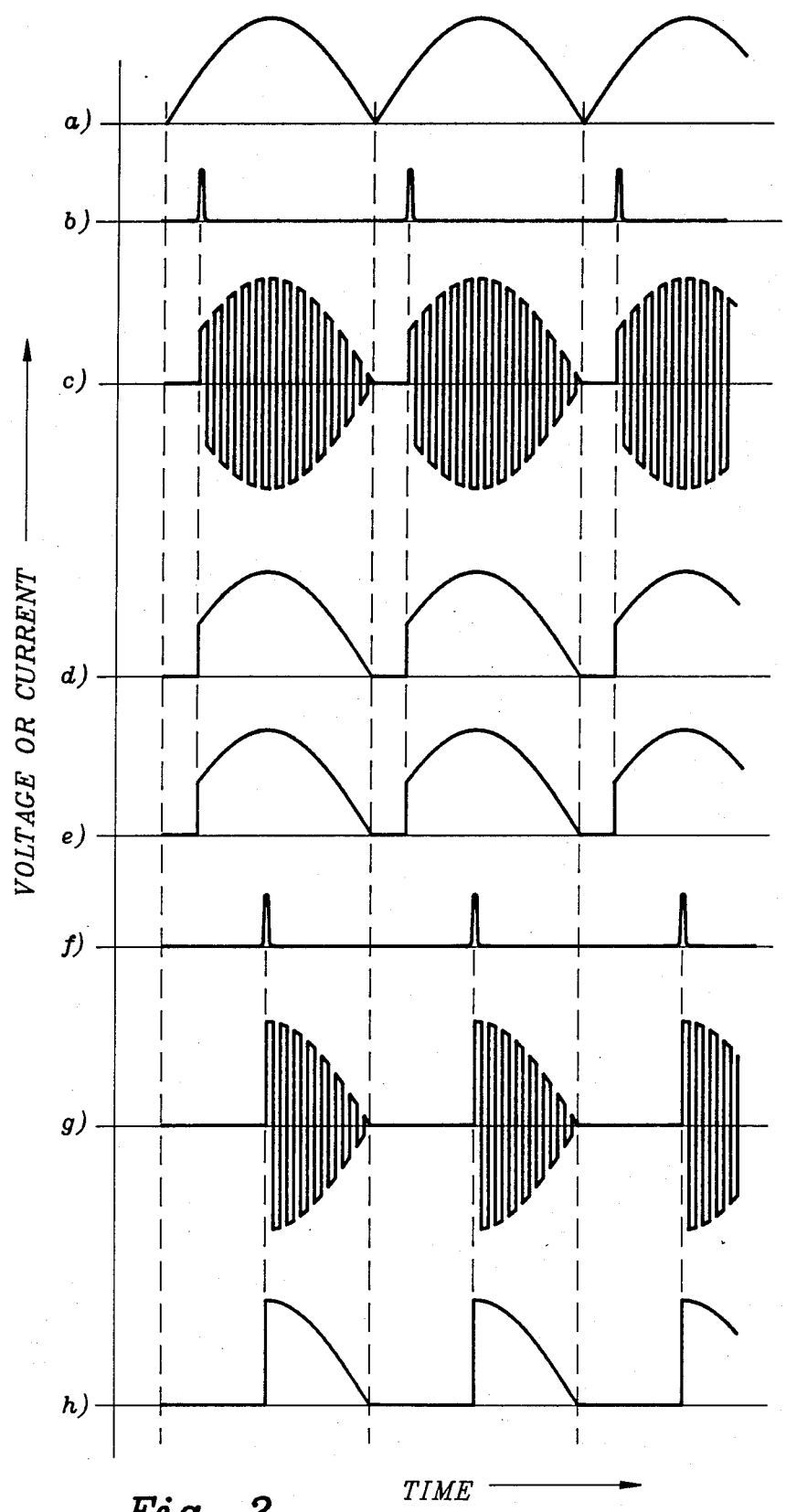
FIGS. 2a–2h shows various voltage and current waveforms associated with different aspects of the preferred embodiment.

FIG. 2a shows the full-wave rectified 120 volt/60 Hz power line voltage.

FIG. 2b shows the trigger pulses as provided to the main inverter.

FIG. 2c shows the high-frequency squarewave voltage output of the main inverter.

FIG. 2d indicates the shape of the anode current provided to the magnetron.

FIG. 2e shows the corresponding current drawn by the inverter from the full-wave rectifier means.

FIGS. 2f to 2h show the waveforms of FIGS. 2b to 2d for the situation of providing delayed trigger pulses.

DESCRIPTION OF OPERATION

The operation of the power supply arrangement of FIG. 1 may be further explained as follows.

FIG. 1 shows two half-bridge inverters: an auxiliary inverter AI consisting of transistors Q1a and Q1b with their respective saturable positive feedback transformers FT1a and FT1b; and a main inverter MI consisting of transistors Q2a and Q2b with their respective saturable positive feedback transformers FT2a and FT2b.

Both inverters are capable of self-oscillation by way of positive feedback. When they do oscillate, the frequency of oscillation is about 30 kHz. For further explanation of the operation of this type of inverter, reference is made to U.S. Pat. No. 4,184,128 to Nilssen, and particularly to FIG. 8 thereof.

Each of these inverters has to be triggered into oscillation; but they will only oscillate as long as the magnitude of the voltage between the B− bus and the B+ bus exceeds about 20 Volt. Thus, if one of the inverters is triggered into oscillation at the beginning of one of the sinusoidally-shaped DC voltage pulses existing between the B− bus and the B+ bus (as resulting from the unfiltered full-wave rectification of the voltage from the ordinary 120 Volt/60 Hz power line and as indicated by FIG. 2a), that inverter will cease oscillating at the end of that DC voltage pulse. Thus, to keep either one of the inverters operating on a continuous basis, it is necessary that it be re-triggered at a rate of 120 times per second—i.e., once in the beginning of each half-cycle of the 120 Volt/60 Hz power line voltage, as illustrated by FIG. 2b.

Both the half-bridge inverters use capacitors Ca and Cb to provide for an effective center-tap between the B− bus and the B+ bus—this center-tap being junction JC.

When power line voltage is applied to the arrangement of FIG. 1, capacitor C1 will immediately start to receive charge from the B+ bus. As soon as C1 has reached a voltage high enough to cause breakdown of Diac D1, a trigger pulse will be applied to the base of transistor Q1b, thereby initiating auxiliary inverter AI into self-oscillation.

The time required for capacitor C1 to be charged to Diac breakdown voltage is arranged to be but a small fraction of the length of a half-cycle of the 60 Hz power line voltage; which, as indicated in FIG. 2c, implies that the auxiliary inverter AI will be triggered into oscillation near the beginning of each of the 120 Hz DC pulses provided between the B− bus and the B+ bus.

In other words, since it is being continuously triggered, the output from auxiliary inverter AI will be a relatively high-frequency (30 kHz) squarewave AC voltage 100% amplitude-modulated at a frequency of 120 Hz.

By way of auxiliary transformer AT, the output from auxiliary inverter AI is applied to the cathode of the magnetron, thereby conditioning the magnetron and making it ready to conduct. For a typical fluorescent magnetron, this conditioning takes from 1.0 to 1.5 second, after which time the magnetron cathode has reached incandescence and is capable of adequate electron emission.

And, after this initial conditioning period of about 1.5 second, main inverter MI is started, thereby providing main power to the magnetron only after it has become completely thermionic and ready to conduct.

This delayed action on behalf of the main inverter is achieved by providing for a delay in making transistor Q2 conductive; which delay is due to the time it takes for capacitor C2a to charge to a voltage high enough to cause current to flow into the base of Q2. After this sufficiently high voltage has been reached, however, the time to charge C2 to the point of breaking down Diac D2 is only a small friction of the length of a half-cycle of the 120 Volt/60 Hz power line voltage—as indicated by FIG. 2b—just as in the case of capacitor C1 and Diac D1.

In other words, when starting from a discharged state, it takes about 1.5 second before transistor Q2 reaches the point of being conductive; but once that point is reached, its conductivity is such as to cause capacitor C2 to be charged up with a time-constant of about one millisecond.

Thus, under normal circumstances, as soon as main inverter MI starts to oscillate (thereby starting to provide bursts of 30 kHz squarewave output voltage in accordance with FIG. 2c), the magnetron starts to conduct, having by that time been fully conditioned.

Main power to the magnetron is provided by way of the L-C series-circuit connected directly across main inverter output terminals OT2x and OT2y. This L-C series-circuit is resonant at or near the 30 kHz inversion frequency of the main inverter; and the magnetron load is in effect connected in parallel with the tank capacitor of this L-C circuit.

Thus, as long as the magnetron does indeed represent a load, the resonant L-C circuit is series-excited and parallel-loaded.

In order to provide for good operating efficiency as well as good power factor, the Q-factor of the resonant L-C circuit is made quite high; which implies that, if the L-C circuit is not adequately loaded, it will represent a near short circuit to the main inverter's output. Hence, before starting the main inverter, it is imperative that the magnetron be connected and that it be ready to conduct—or, alternatively, that some other load be provided.

The magnetron is powered by way of main transformer MT, with the magnetron being powered by DC voltage pulses provided by way of the voltage-doubling rectifier arrangement consisting of rectifiers RE1 and RE2 as combined with energy-storing capacitors CMa and CMb. The approximate shape of these DC voltage pulses is illustrated by FIG. 2d.

To provide for proper voltage-doubling, as well as to minimize 30 kHz ripple (or magnitude modulations) of the unidirectional current pulses provided to the magnetron, it is important that capacitors CMa and CMb be of adequate energy storing capability. However, with an inverter frequency of about 30 kHz, and with the typical magnetron requiring an input power of approximately 1000 Watt, it is adequate if these capacitors store an amount of energy that is somewhat larger than the amount of energy drawn by the magnetron during one complete cycle of the 30 kHz inverter voltage. Thus, capacitors CMa and CMb should each be capable of storing approximately 50 milli-Joule.

Otherwise, the following points should be noted.

(a) To prevent redundant triggering of the auxiliary inverter, a diode may be placed between junctions DJ1 and J1 for inverter AI—with its cathode connected with J1.

Similarly, to prevent redundant triggering of the main inverter, a diode may be placed between junctions DJ2 and J2—with its cathode connected with J2.

(b) With a high-Q resonant L-C circuit being series-excited and parallel-loaded, the magnitude of the current drawn from the source will be approximately proportional to the magnitude of the voltage provided by the source. Hence, the magnitude of the 30 kHz current drawn from the main inverter is approximately proportional to the magnitude of the 30 kHz voltage provided by the main inverter; which means that the magnitude of the current drawn by the inverter is approximately proportional to the magnitude of the DC voltage provided to the inverter (as illustrated by FIG. 2e); which, in turn, means that power factor associated with the power drawn from the power line by the power supply of FIG. 1 is very good.

(c) Capacitors Ca and Cb of FIG. 1 are sized such as not to store a significant amount of energy in comparison to the amount of energy drawn by the power supply (i.e., principally by the magnetron) during one complete half-cycle of the 120 Volt/60 Hz power line voltage, while at the same time to store an amount of energy that is several times as large as the amount of energy drawn by the inverters during one half-cycle of the 30 kHz inverter output voltage.

(d) The power supplied to the magnetron depends on the timing or phasing of the trigger pulses provided to main inverter MI. In turn, the timing of these trigger pulses depend on the delay associated with the process of charging capacitor C2 to a voltage high enough to cause breakdown of Diac D2. The length of this delay can be adjusted over a wide range by adjusting the resistance value of R2a (and/or by changing the capacitance of C2a and/or the threshold voltage on Zener diode Z2a).

Hence, by making R2a an adjustable resistor, the amount of power provided to the magnetron may be adjusted over a wide range—as indicated by FIGS. 2*f*, 2*g* and 2*h*.

It is believed that the present invention and its several attendant advantages and features will be understood from the preceeding description. However, without departing from the spirit of the invention, changes may be made in its form and in the construction and interrelationships of its component parts, the form herein presented merely representing the presently preferred embodiment.

I claim:

1. A power supply for a magnetron, said magnetron having, an anode and requiring to receive a conditioning input in order to be effectively operable to receive anode power, said power supply comprising:
    rectifier means connected with an AC source and operable to provide an output of periodic DC voltage pulses;
    inverter powered by these periodic DC voltage pulses and operable, when receiving an actuating input, to provide correspondingly periodic bursts of high-frequency voltage, the frequency of said high-frequency voltage being substantially higher than the frequency of said periodic DC voltage pulses;
    voltage transformation means operative to receive said periodic bursts of high-frequency voltage and to provide correspondingly periodic pulses of high-magnitude DC voltage to the anode of said magnetron;
    conditioning means operable to provide said conditioning input; and
    actuating means operable to provide said actuating input, but only some time period after the conditioning means has started to provide said conditioning input.

2. The power supply of claim 1 wherein said time period is on the order of one second in duration.

3. The power supply of claim 1 wherein said voltage transformation means comprises an L-C circuit that is resonant at or near the frequency of said high-frequency voltage.

4. A Power supply for a magnetron, said magnetron having an anode and requiring to receive conditioning input in order to be effectively operable to receive anode power, said power supply comprising:
    transformation means connectable with an AC source and operative, when being supplied with an actuating signal, to provide periodic pulses of high-magnitude DC voltage to said anode;
    conditioning means operable to provide said conditioning input; and
    actuating means operable to supply said actuating signal, but only some time period after the conditioning means has started to provide said conditioning input.

5. A power supply arrangement for a magnetron, said magnetron having main input terminals adapted to receive magnetron operating power, as well as auxiliary input terminals adapted to receive magnetron conditioning power, said magnetron having to receive conditioning power in order to be effectively operable to receive operating power, said arrangement comprising
    a source providing an output of periodically intermittent squarewave voltage, said source having to be supplied with an actuating signal in order to provide said output;
    transformation means connected with said output of squarewave voltage and operable to transform its output into a periodically intermittent high-magnitude substantially sinusoidal AC voltage and to provide this AC voltage to a high-voltage rectifier means, the rectifier means being connected with said main input terminals and providing thereto a high-magnitude periodically intermittent DC output voltage operable to supply said magnetron operating power;
    conditioning means connected with said auxiliary input terminals and operable to provide said conditioning power; and
    actuating means connected with said source and operable to supply said actuating signal, but only after said conditioner means has been providing said conditioning power for some period of time.

6. The arrangement of claim 5 wherein said transformation means comprises a series-combination of an inductor and a capacitor, and wherein said series-combination is resonant at or near the fundamental frequency of said squarewave voltage, thereby being operative to converter said squarewave voltage into said substantially sinusoidal voltage;

7. The arrangement of claim 5 wherein said source of squarewave voltage comprises frequency conversion means connected with an ordinary electric utility power line and operable to provide said squarewave voltage, and where the frequency of said squarewave voltage is substantially higher than that of the voltage normally present on said power line.

8. The arrangement of claim 7 wherein said periodically intermittent high-magnitude DC voltage is substantially free of magnitude modulations at frequencies equal to or higher than the frequency of said squarewave voltage.

9. The arrangement of claim 5 wherein the duration of said time period is on the order of one second.

10. An electronic circuit arrangement comprising
    rectifier means connected with an ordinary electric utility power line and operable to provide periodic DC voltage pulses at a DC output;
    inverter means connected with said DC output and operative, but only if being supplied with an actuating signal, to provide periodic intermittent bursts of squarewave voltage at a squarewave output, the frequency of this squarewave voltage being substantially higher than the frequency of the voltage on said power line;
    an L-C circuit resonant at or near the frequency of the squarewave voltage and effectively series-connected across the squarewave output, said L-C circuit representing a potentially destructive short circuit to said output except if provided with an effective load;
    magnetron load means connected with said L-C circuit and operable to constitute said effective load, but only after having been supplied for a period of time with conditioning power by way of a set of conditioning terminals;

conditioning means connected with these conditioning terminals and operable to provide said conditioning power; and actuating means operable to supply said actuating signal, but only after said conditioning means has been providing said conditioning power for at least said period of time.

11. An electronic circuit arrangement comprising a source of AC voltage;

transformation means connected with said source and operative, as long as supplied with an actuating signal, to provide at an output periodic pulses of high-magnitude DC voltage, a minimum amount of energy having to be provided by said output for each of said pulses in order to prevent damage to said transformation means;

magnetron load means connected with said output and operable, but only after having been provided with a conditioning input for a period of time, to absorb therefrom at least said minimum amount of energy;

conditioning means connected with said magnetron load means and operable to provide said conditioning input; and actuating means operable to supply said actuating signal, but only after said conditioning means has been providing said conditioning input for at least said period of time.

12. The arrangement of claim 11 wherein the duration of said period of time is on the order of one second.

13. The arrangement of claim 11 wherein said transformation means comprises an L-C circuit that is resonant at or near the fundamental frequency of said AC voltage.

14. The arrangement of claim 11 wherein said actuating signal consists of trigger pulses and supplies at least one trigger pulse for each pulse of high-magnitude DC voltage.

15. The arrangement of claim 11 wherein said source of AC voltage is an ordinary electric utility power line and wherein said transformation means comprises frequency conversion means.

* * * * *